US011045882B2

(12) United States Patent
Hiromoto

(10) Patent No.: US 11,045,882 B2
(45) Date of Patent: Jun. 29, 2021

(54) CHUCK MECHANISM

(71) Applicant: KITAGAWA IRON WORKS CO., LTD, Hiroshima (JP)

(72) Inventor: Tomonari Hiromoto, Hiroshima (JP)

(73) Assignee: KITAGAWA IRON WORKS CO., LTD, Hiroshima (JP)

( * ) Notice: Subject to any disclaimer, the term of this patent is extended or adjusted under 35 U.S.C. 154(b) by 0 days.

(21) Appl. No.: 16/480,069

(22) PCT Filed: Apr. 3, 2018

(86) PCT No.: PCT/JP2018/014295
§ 371 (c)(1),
(2) Date: Jul. 23, 2019

(87) PCT Pub. No.: WO2018/186409
PCT Pub. Date: Oct. 11, 2018

(65) Prior Publication Data
US 2019/0366448 A1    Dec. 5, 2019

(30) Foreign Application Priority Data
Apr. 5, 2017   (JP) .............................. JP2017-075365

(51) Int. Cl.
*B23B 31/16*       (2006.01)
(52) U.S. Cl.
CPC .. *B23B 31/16279* (2013.01); *B23B 31/16275* (2013.01); *B23B 31/16295* (2013.01)
(58) Field of Classification Search
CPC ........ B23B 31/16045; B23B 31/16275; B23B 31/16295; B23B 31/16245
See application file for complete search history.

(56) References Cited

U.S. PATENT DOCUMENTS 4,200,300 A * 4/1980 Rohm ............... B23B 31/16245
279/121
4,982,970 A 1/1991 Otani et al.
(Continued)

FOREIGN PATENT DOCUMENTS

DE    4016775 C1 *  4/1991 ....... B23B 31/16295
FR    2228572 A1 * 12/1974 ....... B23B 31/16045
(Continued)

OTHER PUBLICATIONS

Translation of International Search Report dated Jun. 19, 2018 in corresponding International Application No. PCT/JP2018/014295; 2 pages.
(Continued)

*Primary Examiner* — Eric A. Gates
*Assistant Examiner* — Paul M Janeski
(74) *Attorney, Agent, or Firm* — Maier & Maier, PLLC

(57) ABSTRACT

A projecting part 11A and a recessed part 12A which engage with each other are formed on a master jaw 11 and a top jaw 12. In the master jaw 11, a movable pin 20 movable in an axial direction and a shaft 30 movable in a radial direction is disposed, and the movable pin 20 is engaged with the shaft so that the movable pin 20 can be moved in the axial direction. The top jaw 12 is provided with a pin hole 12c into which the movable pin 20 can be inserted. The movable pin 20 is locked, by rotating the shaft 30 by a predetermined amount, at a first position in which the movable pin 20 is inserted in the pin hole 12c or at the second position in which the movable pin 20 is extracted from the pin hole 12c.

6 Claims, 10 Drawing Sheets

(56) References Cited

U.S. PATENT DOCUMENTS

| | | | |
|---|---|---|---|
| 5,129,662 A | | 7/1992 | Kempken |
| 5,842,705 A | * | 12/1998 | Tabachenko ...... B23B 31/16275 |
| | | | 279/124 |
| 2016/0245250 A1 | | 8/2016 | Noguchi |

FOREIGN PATENT DOCUMENTS

| | | | |
|---|---|---|---|
| JP | S64-34108 U | | 3/1989 |
| JP | H01-306106 A | | 12/1989 |
| JP | H03-19704 A | | 1/1991 |
| JP | H04-201006 A | | 7/1992 |
| JP | H10-230403 A | | 9/1998 |
| JP | 3081236 B2 | * | 8/2000 |
| JP | 2004-008349 A | | 1/2004 |
| JP | 2015-075048 A | | 4/2015 |

OTHER PUBLICATIONS

Extended European Search Report dated Jan. 29, 2020, including the Supplementary European Search Report and the European Search Opinion, in connection with corresponding EP Application No. 18780593.2 (10 pgs.).

* cited by examiner

CHUCK MECHANISM

TECHNICAL FIELD

The present invention relates to a chuck mechanism for gripping an object to be processed (workpiece).

BACKGROUND ART

A chuck mechanism for gripping a workpiece comprises a plurality of master jaws installed on a front surface of a chuck main body so as to be movable in a radial direction and top jaws each removably attached to a front surface of each of the master jaws.

PTL 1 discloses a chuck mechanism which allows the top jaws to be attached and detached quickly. In the chuck mechanism of PTL 1, as shown in FIG. 10, a projecting part 110A and a recessed part 120A which engage with each other are formed respectively on a master jaw 110 installed on a front surface of a chuck main body 100 and on a top jaw 120. The projecting part 110A and the recessed part 120A comprise a side surface consisting of a part of surface of a cone (conical surface), and the top jaw 120 is attached and detached by rotating the top jaw 120 around a center axis of the cone.

A gap is provided between the conical surface of the projecting part 110A and the conical surface of the recessed part 120A so that the top jaw 120 can rotate. Therefore, the top jaw 120 may be detached from the master jaw 110 and ejected when the chuck mechanism is rotated without gripping a workpiece after the top jaw 120 is attached to the master jaw 11. In order to avoid such a situation, the chuck mechanism is provided with a locking means to prevent the top jaw 120 from rotating with respect to the master jaw 110.

In particular, as shown in FIG. 11, the chuck mechanism prevents the top jaw 120 from rotating with respect to the master jaw 110 by fitting a positioning pin 130 which is inserted into a hole 110B formed from an axially outer side of the master jaw 110 into a hole 120B formed on the top jaw 120. Here, the positioning pin 130 is fitted into the hole 120B while being biased forward in an axial direction by a spring 140 disposed in the hole 110B.

Further, as shown in FIG. 11, a notch pin 150 is inserted into a hole 110C formed from a radially outer side of the master jaw 110, and an inclined groove 130A engaging with the notch pin 150 is formed in the positioning pin 130. Consequently, by pressing the notch pin 150, the positioning pin 130 is removed from the hole 120B, and thus the top jaw 120 can be rotated and detached from the master jaw 110.

CITATION LIST

Patent Literature

[PTL 1] JP-A-1-306106

SUMMARY OF INVENTION

Technical Problem

In the chuck mechanism disclosed in PTL 1, the positioning pin 130 for preventing the rotation of the top jaw 120 is always biased toward the top jaw 120 by the spring 140. When the top jaw is detached or attached, it is thus necessary to keep pressing the notch pin 150 to keep the positioning pin 130 removed from the hole 120B.

Therefore, when the top jaw 120 is automatically replaced, two devices (robots), that is, a device (robot) serving to keep pressing the notch pin 150 and a device (robot) serving to replace the top jaw 120, are required. This causes a problem of increased costs for automation. On the other hand, when the top jaw 120 is replaced manually, it is necessary to simultaneously keep pressing the notch pin 150 and replace the top jaw 120. Therefore, there are problems in terms of workability and safety. In addition, it is difficult to visually confirm, based on a degree of pressing of the notch pin 150, whether the positioning pin 130 is removed from the hole 120B.

The present invention has been made in view of the problems described above. The main objective thereof is to provide a chuck mechanism allowing a top jaw to be easily replaced, wherein a projecting part and a recessed part which engage with each other are formed on a master jaw and the top jaw, and the top jaw is attached and detached by relatively rotating the master jaw or the top jaw circumferentially along a conical surface of the projecting part and the recessed part.

Solution to Problem

The chuck mechanism according to the present invention comprises: a chuck main body; a plurality of master jaws installed on a front surface of the chuck main body so as to be movable in a radial direction; and top jaws each removably attached to a front surface of each of the master jaws. At portions facing to each other in an axial direction, each of the master jaws and each of the top jaws respectively comprise a side surface consisting of a part of surface of a cone and are respectively provided with a projecting part and a recessed part which engage with each other. A movable pin movable in the axial direction and a shaft movable in the radial direction are disposed in each of the master jaws. The movable pin is engaged with the shaft so as to be movable in the axial direction by rotating the shaft. Each of the top jaws is provided with a pin hole into which the movable pin can be inserted. The chuck mechanism further comprises a lock mechanism by which the movable pin is locked at a first position in which the movable pin is inserted into the pin hole or at a second position in which the movable pin is extracted from the pin hole respectively by rotating the shaft by a predetermined amount.

Advantageous Effects of Invention

According to the present invention, provided is the chuck mechanism in which the projecting part and the recessed part which engage with each other are formed on the master jaw and the top jaw, respectively, and the top jaw can be attached and detached by relatively rotating the master jaw or the top jaw along a conical surface of the projecting part and the recessed part. The chuck mechanism allows the top jaw to be easily replaced.

DESCRIPTION OF EMBODIMENTS

Hereinafter, embodiments of the present invention will be described in detail with reference to the drawings. The present invention is not limited to the following embodiments. Further, modifications can be made as appropriate without departing from the scope of the effects of the present invention.

Figure 1:
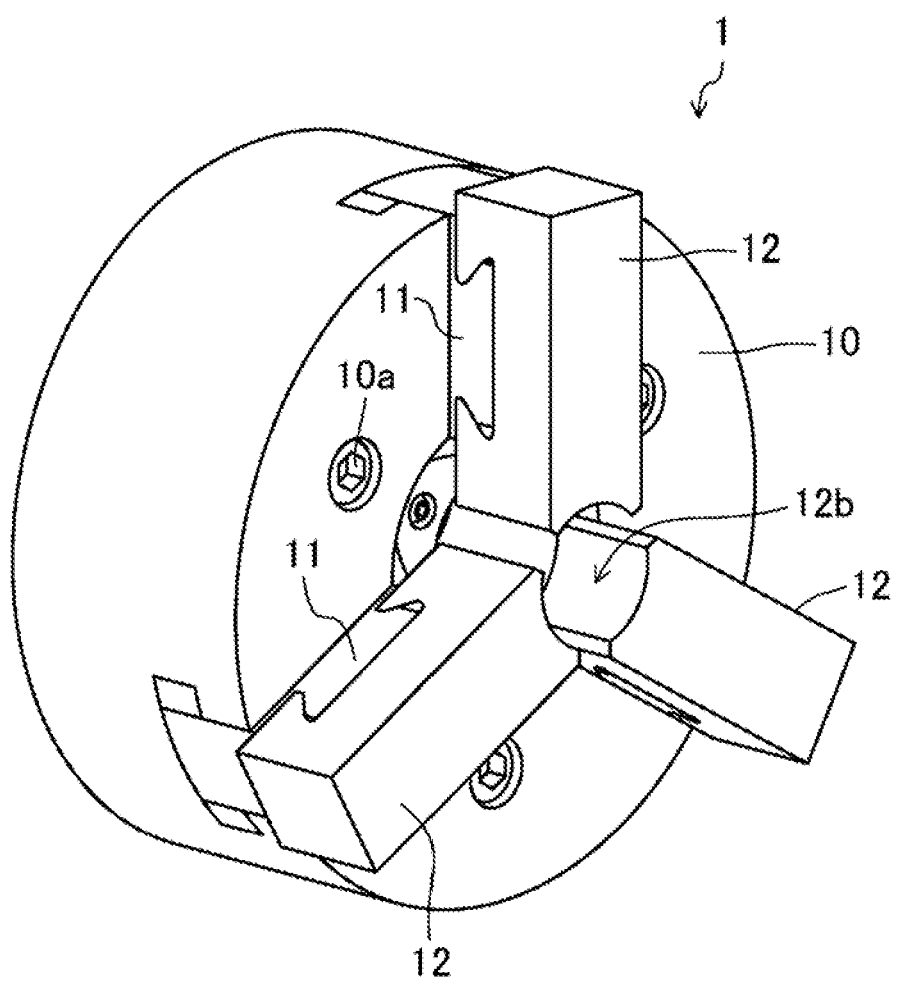
FIG. 1 is a perspective view schematically showing a configuration of a chuck mechanism according to an embodiment of the present invention.
Figure 2:
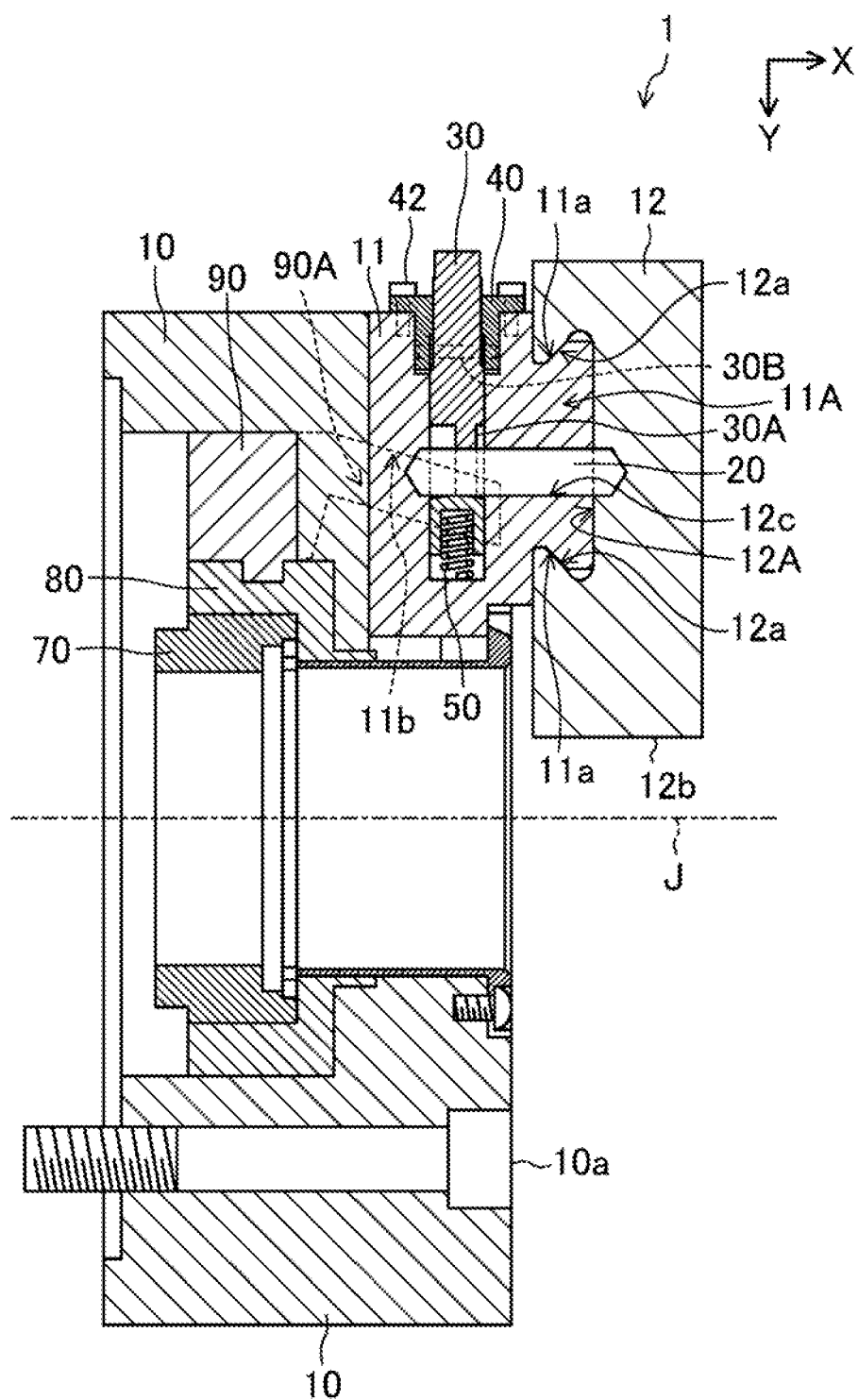
FIG. 2 is a cross-sectional view schematically showing the configuration of the chuck mechanism according to the embodiment of the present invention.

FIG. 1 and FIG. 2 schematically show a configuration of a chuck mechanism according to an embodiment of the present invention. FIG. 1 is a perspective view, and FIG. 2 is a cross-sectional view. In the description of the present embodiment, a direction X parallel to a rotation axis J of a chuck main body is referred to as an "axial direction", while a radial direction Y centering around the rotation axis J is referred to as a "radial direction".

As shown in FIG. 1, a chuck mechanism 1 of the present embodiment comprises a chuck main body 10, a plurality of (three in the present embodiment) master jaws 11 installed on a front surface of the chuck main body 10 so as to be movable in the radial direction, and top jaws 12 each removably attached to a front surface of each of the master jaws 11. A gripping surface 12b for gripping a workpiece is formed on an end surface on a center side of the top jaw 12.

As shown in FIG. 2, the chuck main body 10 is fixed to a machine tool (not shown) by a plurality of bolts 10a and rotates around the rotation axis J.

A draw nut 70 is accommodated inside the chuck main body 10 so as to be movable in the axial direction. A wedge plunger 90 is engaged with the draw nut 70 via a plunger 80. The wedge plunger 90 is provided with a wedge part 90A inclined with respect to the axial direction, and an inclined groove 11b to be fitted to the wedge part 90A is formed inside the master jaw 11. The wedge plunger 90 is thus moved in the axial direction along with a movement of the draw nut 70 in the axial direction, so that a movement of the master jaw 11 in the radial direction is controlled.

In the present embodiment, at portions facing to each other in the axial direction, the master jaw 11 and the top jaw 12 are respectively provided with a projecting part 11A and a recessed part 12A which engage with each other. The projecting part 11A and the recessed part 12A respectively comprise a side surface 11a, 12a consisting of a part of surface of a cone (conical surface), and the top jaw 12 can be attached and detached by rotating the top jaw 12 around a center axis of the cone.

A gap is provided between the conical surface 11a of the projecting part 11A and the conical surface 12a of the recessed part 12A so that the top jaw 12 can rotate. The chuck mechanism 1 is provided with a locking means to prevent the top jaw 12 from rotating with respect to the master jaw 11 when the chuck mechanism 1 is rotated without gripping the workpiece after the top jaw 12 is attached to the master jaw 11, in order to prevent the top jaw 12 from being detached from the master jaw 11.

Figure 3:
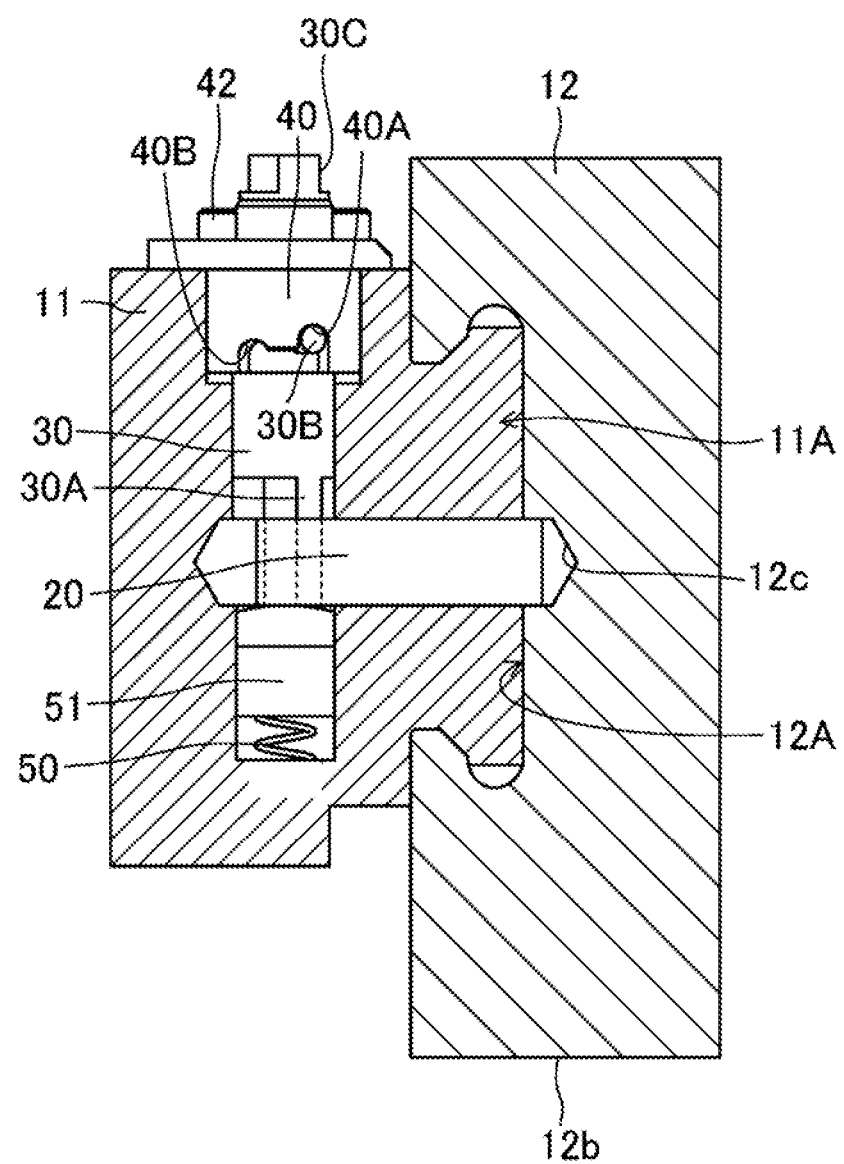
FIG. 3 is an enlarged cross-sectional view of the configuration of a master jaw and a top jaw of the chuck mechanism shown in FIG. 2.

FIG. 3 is a cross-sectional view of a configuration of the master jaw 11 and the top jaw 12 of the chuck mechanism 1 shown in FIG. 2.

As shown in FIG. 3, a movable pin 20 movable in the axial direction and a shaft 30 movable in the radial direction are disposed in the master jaw 11. Further, the top jaw 12 is provided with a pin hole 12c into which the movable pin 20 can be inserted.

Figure 4:
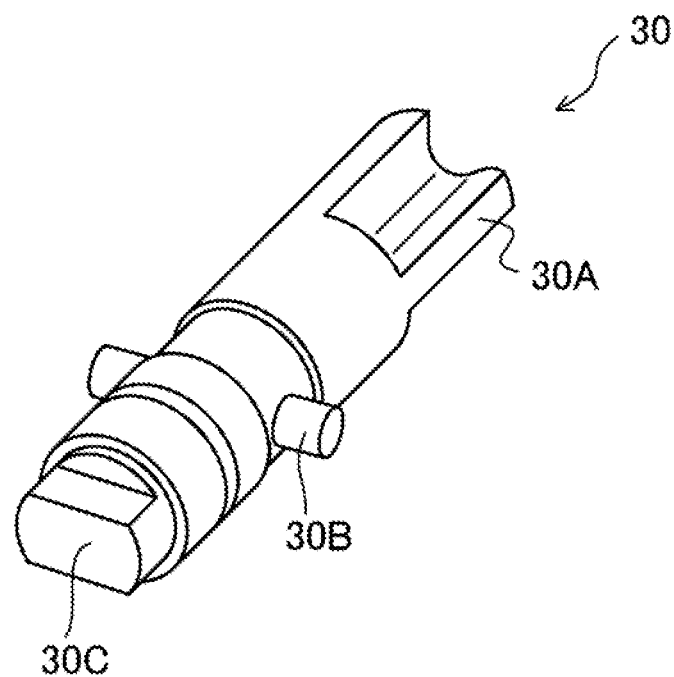
FIG. 4 is a perspective view schematically showing a configuration of a shaft.

As shown in FIG. 4, a projection 30A extending in the radial direction (an axial direction of the shaft 30) is formed on an outer periphery of the shaft 30. On the other hand, a groove (not shown) engaging with the projection 30A is formed on an outer periphery of the movable pin 20. That is, the movable pin 20 is engaged with the shaft 30 so that the movable pin 20 can be moved in the axial direction by a rotation of the shaft 30. The movable pin 20 can be thus inserted into or extracted from the pin hole 12c by the rotational operation of the shaft 30.

As shown in FIG. 4, a lock pin 30B protruding outward in a radial direction of the shaft 30 is provided on the outer periphery of the shaft 30. On the other hand, a shaft cover 40 surrounding the outer periphery of the shaft 30 is disposed in the master jaw 11. On an outer periphery of the shaft cover 40, a first groove 40A and a second groove 40B are formed with a fixed distance therebetween along a circumferential direction so as not to be on a same circumference (so as to be at positions shifted from each other in the radial direction). The lock pin 30B is thus engaged with the first groove 40A or the second groove 40B by rotating the shaft 30 by a predetermined amount. Consequently, the movable pin 20 is locked at a first position where the movable pin 20 is inserted into the pin hole 12c or a second position where the movable pin 20 is extracted from the pin hole 12c.

In this regard, the shaft cover 40 is fixed to the master jaw 11 at a radially outer end of the master jaw 11 by means of a bolt 42 or the like.

Here, the shaft 30 is biased outward in the radial direction (the axial direction of the shaft 30) by a spring 50. By rotating the shaft 30 by the predetermined amount while pressing the shaft 30 inward in the radial direction against a biasing force of the spring 50, the movable pin 20 is locked at the first position (the first groove 40A) or at the second position (the second groove 40B).

A rotational movement of the top jaw 12 with respect to the master jaw 11 can be thus restricted by locking the movable pin 20 at the first position in a state of being inserted into the pin hole 12c while the projecting part 11A and the recessed part 12A are engaged with each other. Consequently, it is possible to prevent the top jaw 12 from being detached from the master jaw 11 when the chuck mechanism is rotated without gripping the workpiece after the top jaw 12 is attached to the master jaw 11.

Figure 5:
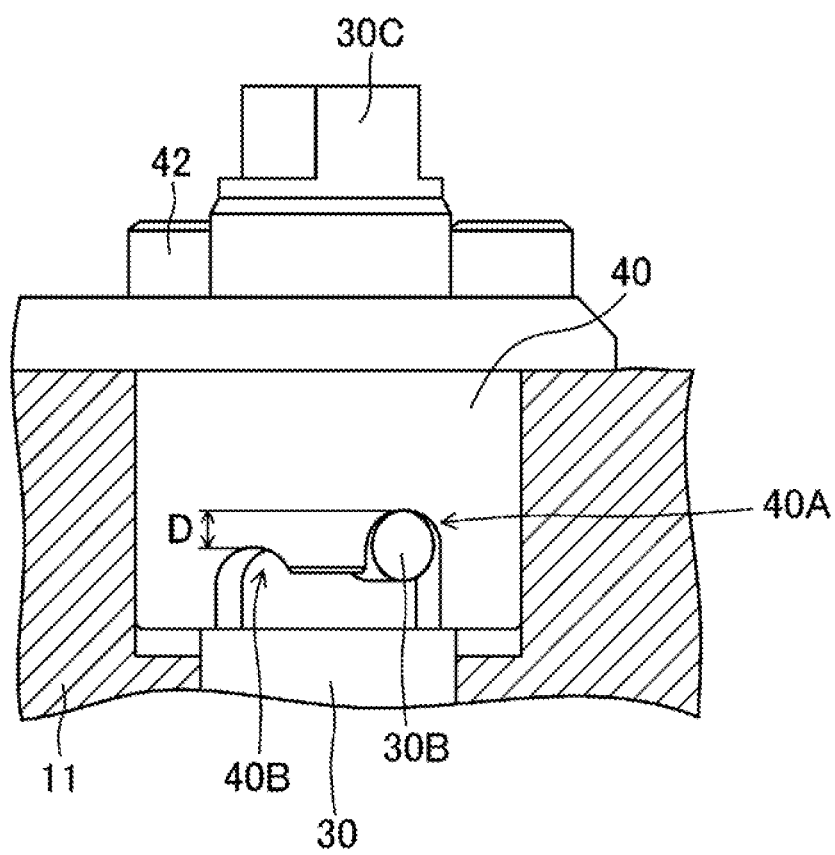
FIG. 5 is an enlarged view of a lock pin engaged with a first groove.

FIG. 5 is an enlarged view of the lock pin 30B engaged with the first groove 40A. Here, assuming that a distance between the first groove 40A and the second groove 40B in the radial direction is D, a difference in a protruding length of an end part 30C of the shaft 30 protruding outward in the radial direction from the master jaw 11 when the lock pin 30B is engaged with the first groove 40A and the second groove 40B corresponds to the distance D. The two positions of the movable pin 20 (the first position in which the movable pin 20 is inserted into the pin hole 12c and the second position in which the movable pin 20 is extracted from the pin hole 12c) can be thus easily recognized by visually observing a change in the protruding length of the shaft end part 30C. Further, since the protruding length changes in two steps, the change in the protruding length can be reliably detected by a sensor or the like.

Figure 6:
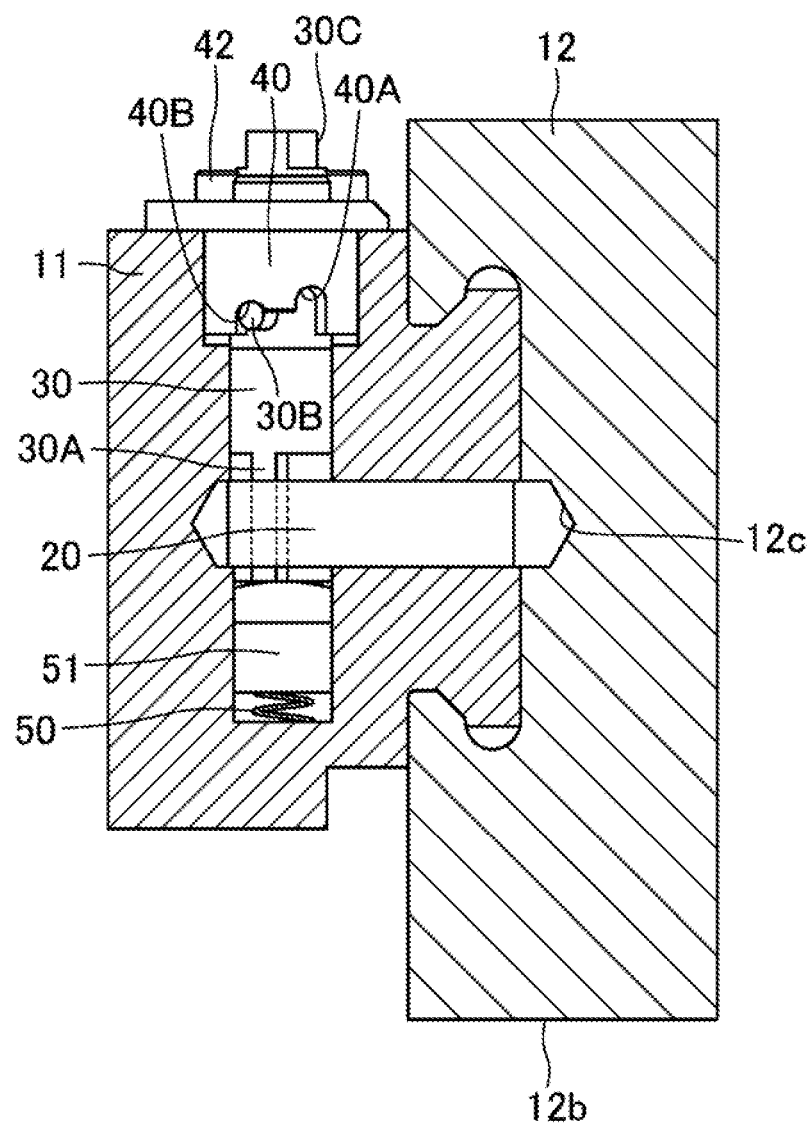
FIG. 6 shows a movable pin locked in a state of being extracted from a pin hole.

FIG. 3 described above shows the movable pin 20 locked in a state of being inserted into the pin hole 12c by engaging the lock pin 30B with the first groove 40A. On the other hand, FIG. 6 shows the movable pin 20 locked in a state of being extracted from the pin hole 12c by engaging the lock pin 30B with the second groove 40B.

In this lock mechanism, the lock pin 30B is always biased by the spring 50 outward in the radial direction while being engaged with the first groove 40A or the second groove 40B. Thus, either lock state is maintained unless the shaft is pressed and rotated. Therefore, by engaging the lock pin 30B with the second groove 40B, the top jaw 12 can be detached or attached while the movable pin 20 is kept extracted from the pin hole 12c. This allows the top jaw 12 to be replaced without keep pressing the shaft 30, and thus the top jaw 12 can be replaced automatically by one device (robot). In addition, even when the top jaw 12 is manually replaced, there is no need to simultaneously keep pressing the shaft 30 and replace the top jaw 12, and thus workability and safety can be improved.

According to the chuck mechanism disclosed herein, the movable pin 20 is locked, by rotating the shaft 30 by the predetermined amount, at the first position in which the movable pin 20 is inserted into the pin hole 12c or at the second position in which the movable pin 20 is extracted from the pin hole 12c. Such a lock mechanism allows the top jaw 12 to be easily replaced.

In addition, the shaft 30 is biased outward in the radial direction (the axial direction of the shaft 30) by the spring 50, so that the movable pin 20 can be locked at the first position or the second position by rotating the shaft 30 by the predetermined amount while pressing the shaft 30 inward in the radial direction against the biasing force of the spring 50.

Further, the shaft cover 40 is disposed on the outer periphery of the shaft 30, and the first groove 40A and the second groove 40B are formed on the outer periphery of the shaft cover 40 at the fixed distance so as not to be on the same circumference. Consequently, the lock pin 30B provided on the outer periphery of the shaft 30 can be engaged with the first groove 40A or the second groove 40B by rotating the shaft 30 by the predetermined amount. The movable pin 20 can be thereby locked at the first position or the second position.

Such a configuration enables the top jaw 12 to be replaced while the movable pin 20 is extracted from the pin hole 12c by engaging the lock pin 30B with the second groove 40B. This allows the top jaw 12 to be replaced without keep pressing the shaft 30, and thus the top jaw 12 can be replaced automatically by one device (robot). In addition, even when the top jaw 12 is manually replaced, there is no need to simultaneously keep pressing the shaft 30 and replace the top jaw 12, and thus workability and safety can be improved.

Further, the protruding length of the end part of the shaft 30 protruding outward in the radial direction from the master jaw 11 is different between when the movable pin 20 is at the first position in which the movable pin 20 is inserted into the pin hole 12c and at the second position in which the movable pin 20 is extracted from the pin hole 12c. Therefore, the two positions of the movable pin 20 can be easily recognized by visually observing a change in the protruding length of the shaft end part 30C. Further, since the protruding length changes in two steps, the change in the protruding length can be reliably detected by a sensor or the like.

(Variation 1)

As shown in FIG. 3, while the shaft 30 is biased outward in the radial direction by the spring 50, the lock pin 30B protruding and provided on the outer periphery of the shaft 30 is locked on an end surface of the shaft cover 40 including the first and the second grooves 40A, 40B. Therefore, the shaft 30 is regulated so as not to be ejected even if a centrifugal force is applied outward in the radial direction from the master jaw 11.

However, if the lock pin 30B is damaged or the like, the regulation does not work, and thus the shaft 30 may be ejected from the master jaw 11.

Figure 7:
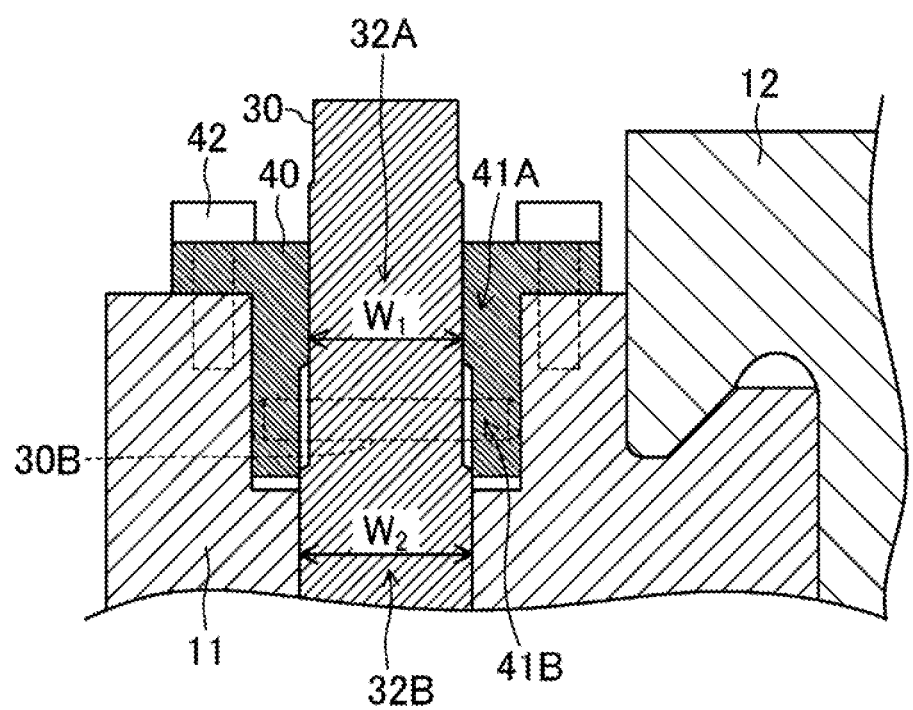
FIG. 7 is a partial cross-sectional view schematically showing a configuration of a shaft and a shaft cover in a variation of the present invention.

FIG. 7 is a partial cross-sectional view schematically showing a configuration of the shaft 30 and the shaft cover 40 comprising a mechanism for preventing such a situation.

As shown in FIG. 7, the shaft 30 is provided with a portion 32A with an outer diameter of W1 and a portion 32B with an outer diameter W2 larger than W1 on an outer side in the radial direction. Further, the shaft cover 40 is provided with a portion 41A with an inner diameter approximately the same as W1 and a portion 41B with an inner diameter approximately the same as W2. Even if the lock pin 30B is damaged or the like, such a configuration can prevent the shaft 30, which is biased outward in the radial direction, from being ejected outward in the radial direction from the master jaw 11 because the portion 32B with the outer diameter W2 is locked by the portion 41A with the inner diameter W1 of the shaft cover 40.

(Variation 2)

In the present embodiment described above, as a lock mechanism for locking the movable pin 20 at the first position in which the movable pin 20 is inserted into the pin hole 12c or at the second position in which the movable pin 20 is extracted from the pin hole 12c, respectively, the first and second grooves 40A, 40B (regulation grooves) are formed on the shaft cover 40, as shown in FIG. 3 and the like, and the lock pin 30B provided on the outer periphery of the shaft 30 is engaged with the regulation grooves. However, the lock mechanism is not limited thereto, and other lock mechanisms can be adopted.

Figure 8:
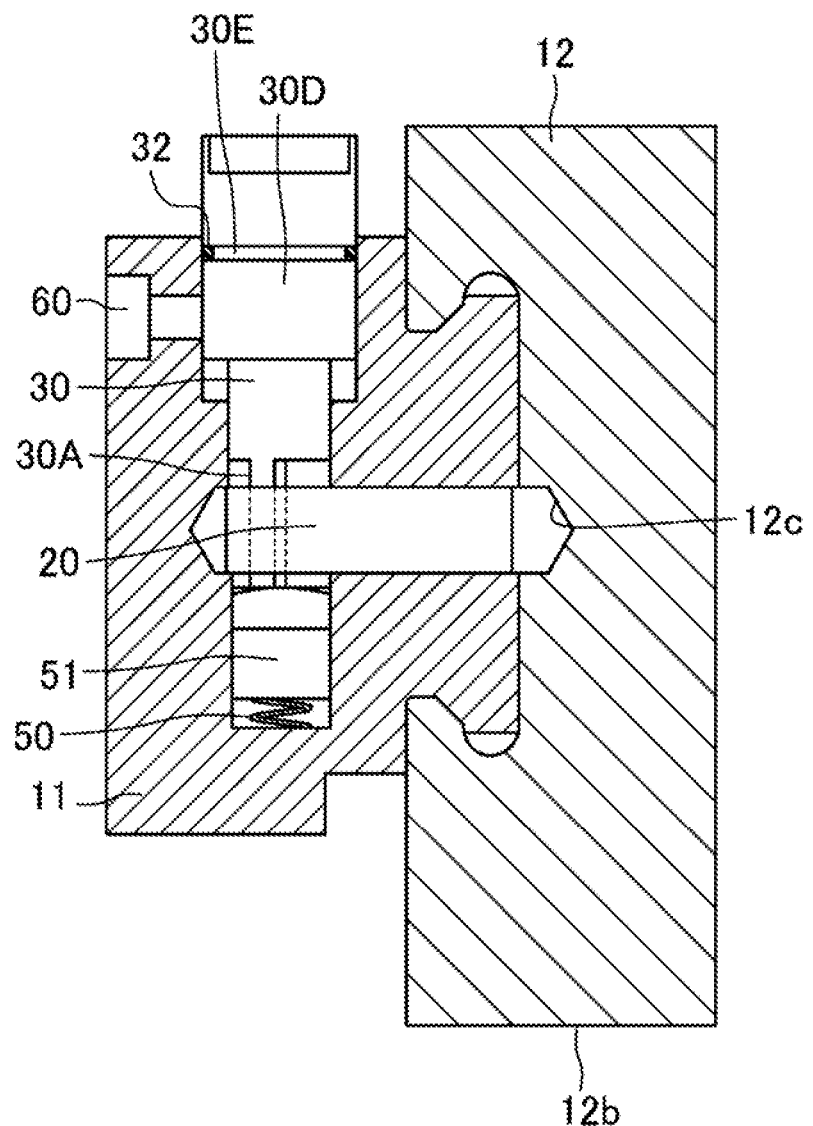
FIG. 8 is a cross-sectional view schematically showing a configuration of a master jaw and a top jaw in another variation of the present invention.
Figure 9A:
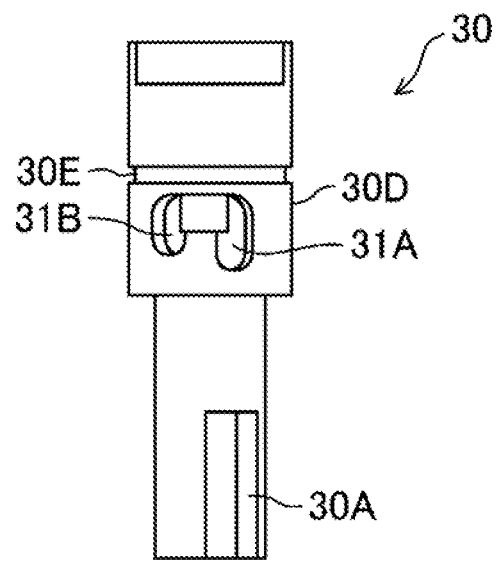
FIG. 9A is a plan view schematically showing a configuration of a shaft.
Figure 9B:
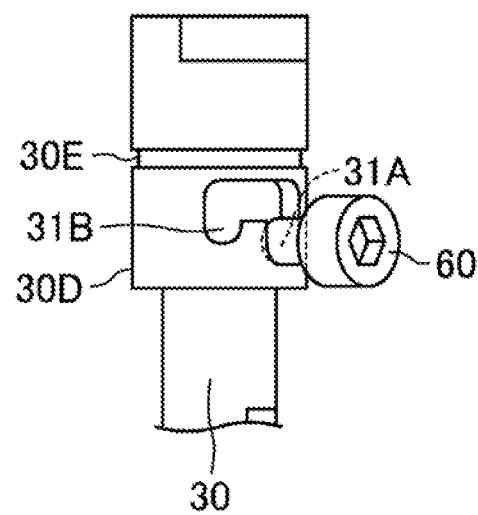
FIG. 9B is a perspective view showing a lock mechanism.
Figure 10:
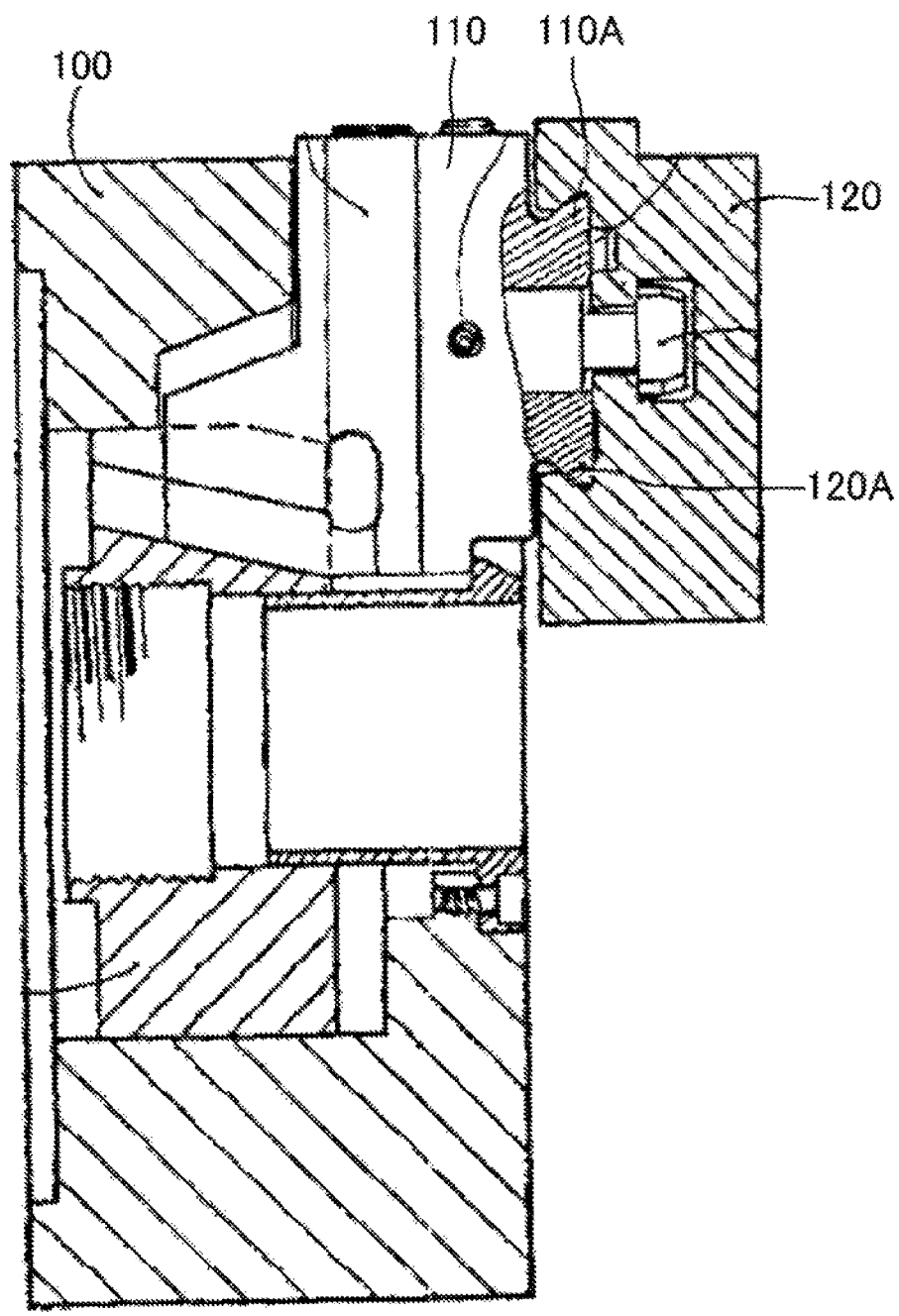
FIG. 10 is a cross-sectional view showing a conventional chuck mechanism.
Figure 11:
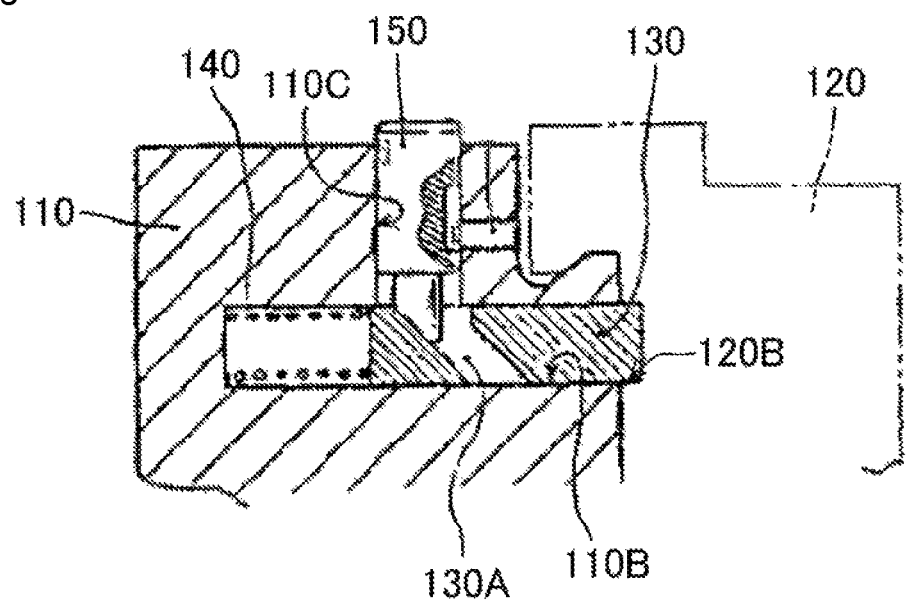
FIG. 11 shows a configuration of a locking means of a top jaw in a conventional chuck mechanism.

FIG. 8, FIG. 9A, and FIG. 9B are drawings showing an example of the lock mechanism in the present variation. FIG. 8 is a cross-sectional view schematically showing a configuration of the master jaw 11 and the top jaw 12. FIG. 9A is a plan view schematically showing a configuration of the shaft 30, and FIG. 9B is a perspective view showing a lock mechanism in the present variation. In this regard, in the present variation, the configurations of the master jaw 11, the top jaw 12, the movable pin 20, and the like are the same as the configurations shown in the embodiment described above, and thus the description thereof is omitted.

As shown in FIG. 8 and FIG. 9A, the present variation is characterized in that the shaft cover 40 with the regulation grooves is eliminated and that the regulation grooves are formed in the shaft 30.

The shaft 30 of the present variation comprises a cylindrical part 30D having an outer diameter larger than that of other portions. On an outer periphery of the cylindrical part 30D, a first groove 31A and a second groove 31B are formed with a fixed distance therebetween along a circumferential direction so as not to be on a same circumference. Here, as in the embodiment described above, the projection 30A that enables the movable pin 20 to move in the axial direction is formed on the outer periphery of the shaft 30. Further, a groove 30E in which O-ring 32 is fitted is formed on the outer periphery of the shaft 30.

As shown in FIG. 8, a bolt 60 is embedded in a rear surface of the master jaw 11. An axial end of the bolt 60 is adapted to be engaged with the first groove 31A or the second groove 31B formed in the shaft 30, as shown in FIG. 9B.

The shaft 30 is biased outward in the radial direction (the axial direction of the shaft 30) by the spring 50. Further, the axial end of the bolt 60 is engaged with the first groove 31A or the second groove 31B by rotating the shaft 30 by the predetermined amount while pressing the shaft 30 inward in the radial direction against the biasing force of the spring 50. By rotating the shaft 30 by the predetermined amount, the movable pin 20 can be thus locked at the first position in which the movable pin 20 is inserted in the pin hole 12c or at the second position in which the movable pin 20 is extracted from the pin hole 12c.

In this regard, the shaft 30 is prevented by the bolt 60 from being ejected outward in the radial direction from the master jaw 11.

Although the present invention has been described above with the preferred embodiments, such description is not a limitation and various modifications are possible. For example, while the lock pin 30B is provided so as to protrude from both sides of the outer periphery of the shaft 30 in the embodiments described above, the lock pin 30B may be provided so as to protrude from only one side. In the former case, since the first and second grooves 31A, 31B are respectively provided at two positions symmetrical in a radial direction of the shaft cover 40, a load applied to the lock pin 30B can be dispersed. Consequently, an outer diameter of the lock pin 30B can be reduced. On the other hand, in the latter case, the first and second grooves 31A, 31B need to be respectively provided at only one position on the outer periphery of the shaft cover 40.

Further, the master jaw 11 and the top jaw 12 used in the embodiments described above are respectively provided with the projecting part 11A and the recessed part 12A which engage with each other. However, the configurations of the master jaw 11 and the top jaw 12 are not limited thereto as long as the top jaw 12 is attached or detached by relatively rotating the master jaw 11 or the top jaw 12 circumferentially along the conical surface of the projecting part 11A and the recessed part 12A.

In addition, while the bolt 60 is used as a member engaged with the first groove 31A or the second groove 31B formed in the shaft 30, the configuration is not limited thereto. For example, a pin or the like may be used.

REFERENCE SIGN LIST

1 Chuck mechanism
10 Chuck main body
11 Master jaw
11A Projecting part
11a Conical surface
12 Top jaw
12A Recessed part
12a Conical surface
12c Pin hole
20 Movable pin
30 Shaft
30B Lock pin
30C Shaft end part
31A First groove
31B Second groove
Shaft cover
40A First groove
40B Second groove
50 Spring

The invention claimed is:

1. A chuck mechanism comprising:
a chuck main body;
a plurality of master jaws installed on a front surface of the chuck main body so as to be movable in a radial direction; and
top jaws each removably attached to a front surface of each of the master jaws,
wherein, at portions facing to each other in an axial direction, each of the master jaws and each of the top jaws respectively comprise a side surface shaped to be conical and are respectively provided with a projecting part and a recessed part which engage with each other;
a movable pin movable in the axial direction and a shaft movable in the radial direction are disposed in each of the master jaws;
the movable pin is engaged with the shaft so as to be movable in the axial direction by rotating the shaft;
each of the top jaws is provided with a pin hole into which the movable pin can be inserted;
the chuck mechanism further comprises a lock mechanism by which the movable pin is locked at a first position in which the movable pin is inserted into the pin hole or at a second position in which the movable pin is extracted from the pin hole respectively by rotating the shaft by a predetermined amount; the lock mechanism comprising a shaft cover provided in each of the master jaws so as to surround an outer periphery of the shaft; and a lock pin protruding outward on the outer periphery of the shaft;
a first groove and a second groove are formed with a fixed distance therebetween on an outer periphery of the shaft cover along a circumferential direction so as not to be on a same circumference; and
the lock pin is configured to be engaged with the first groove or the second groove by rotating the shaft by the predetermined amount to lock the movable pin at the first position or the second position.

2. The chuck mechanism of claim 1, wherein an end part of the shaft protrudes outward in the radial direction from each of the master jaws; and
a protruding length of the end part of the shaft protruding outward in the radial direction from each of the master jaws is different between when the movable pin is at the first position and at the second position.

3. The chuck mechanism of claim 1, wherein each of the top jaws is configured such that a rotational movement thereof with respect to each of the master jaws is restricted by locking the movable pin at the first position in a state of being inserted into the pin hole while the projecting part and the recessed part are engaged with each other.

4. The chuck mechanism of claim 1, wherein each of the top jaws is configured to be attached and detached by relatively rotating each of the master jaws or each of the top jaws circumferentially along a side surface of the projecting part and the recessed part while the movable pin is locked at the second position in a state of being extracted from the pin hole.

5. The chuck mechanism of claim 1,
wherein the movable pin comprises a groove formed on an outer peripheral surface; and
the shaft comprises a projection engaging with the groove.

6. The chuck mechanism of claim 1,
wherein the shaft is biased outward in the radial direction by a spring; and
the movable pin is locked at the first position or the second position by rotating the shaft by the predetermined amount while pushing the shaft inward in the radial direction against a biasing force of the spring.

* * * * *